July 1, 1958
M. C. HOOVER
2,841,718
COMPENSATION FOR TWO POINT REGULATED AMPLIFIER
Filed Nov. 1, 1954
2 Sheets-Sheet 2
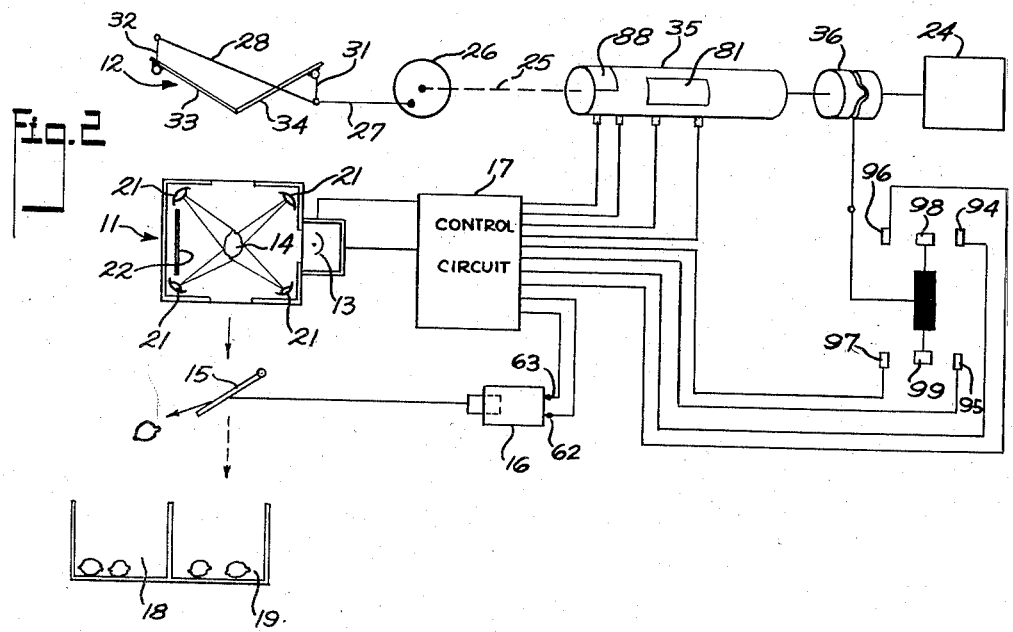
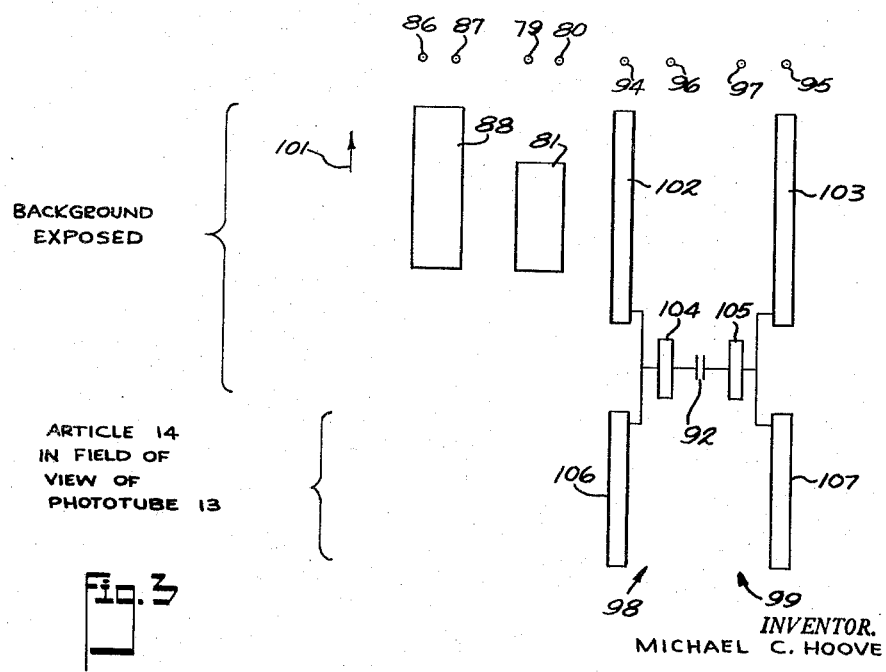
INVENTOR.
MICHAEL C. HOOVER
BY *Frederic B. Schramm*
ATTORNEY

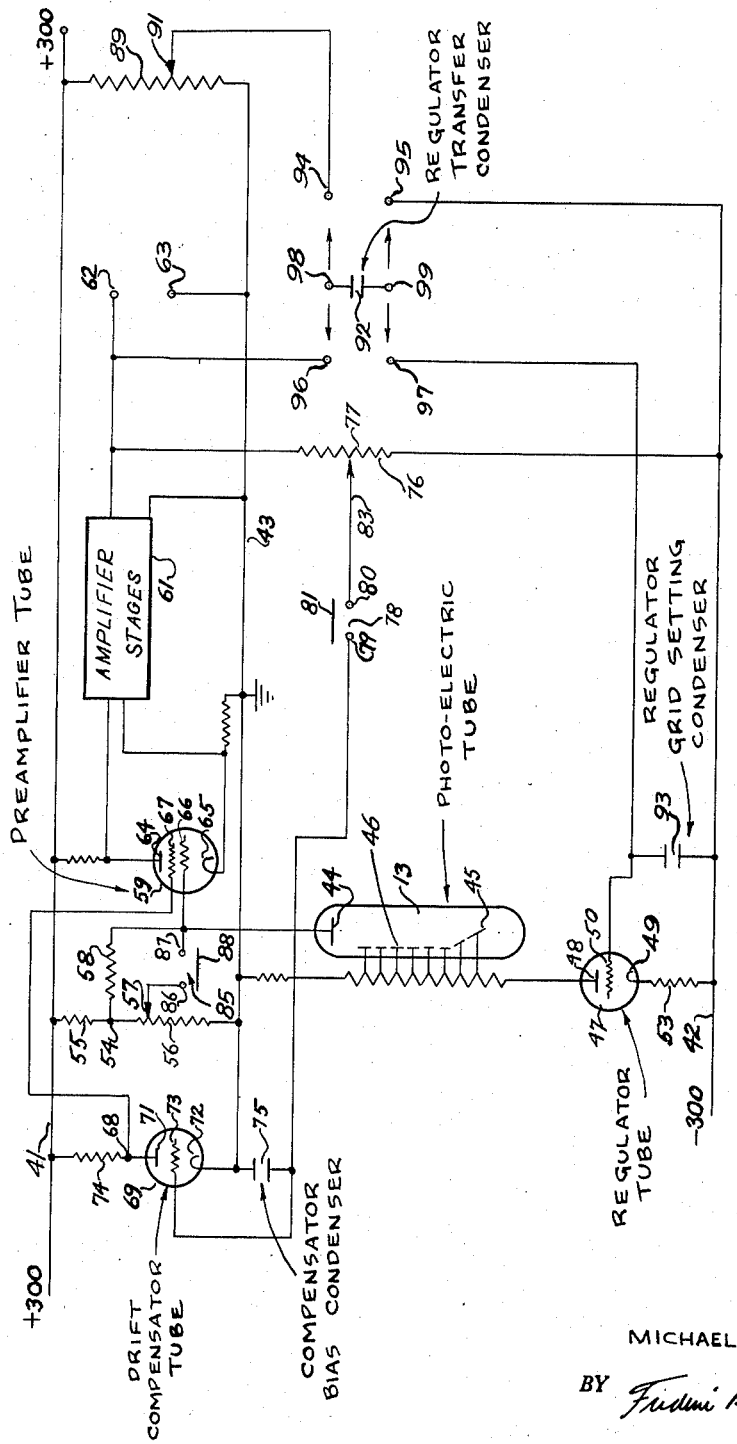

United States Patent Office 2,841,718
Patented July 1, 1958

2,841,718

COMPENSATION FOR TWO POINT REGULATED AMPLIFIER

Michael C. Hoover, Grand Rapids, Mich., assignor to Mandrel Industries, Inc., a corporation of Michigan Application November 1, 1954, Serial No. 465,824

8 Claims. (Cl. 250—214)

This invention relates to control circuits and to sorting.

An object of my invention in general is to provide a simplified control circuit adapted for high speed sorting operation which provides accuracy, reliability and constancy of calibration as well as linearity.

A specific object of my invention is to provide simplified compensation of photo-electric sorting machines for fragile articles which must be handled gently.

Another object of the invention is to provide a photo-electric amplifier circuit suitable for use with free-fall sorting machines as well as with sorting machines of other types.

Still another object of the invention is to provide a photo-electric circuit which maintains its calibration accurately, independently of factors which have heretofore caused disturbance in some types of apparatus, such as tube aging, lamp aging, voltage variations in tube or lamp filaments, photo-electric tube aging, or dust and dirt in any part of the optical system, and other factors causing amplifier drift.

Other and further objects, features and advantages of the invention will become apparent as the description proceeds.

Optical sorting machines of the photo-electric type have been employed, for example, in the sorting of fruits, beans, and nuts on a basis of light reflecting power or color so that the product, after acceptance by the machine is substantially uniform and so that discolored or otherwise defective specimens are rejected. The machines are not only much more rapid in action than human inspectors or graders, but are far more accurate and consistent.

Examples of the type of machines to which reference is made are disclosed in U. S. Patents Numbers 2,131,095; 2,152,758; 2,244,826; 2,264,621; 2,325,665; 2,474,230; 2,625,265 and 2,690,258 to David C. Cox, and in copending Cox application Serial No. 294,427 filed June 19, 1952.

In such machines it is desirable to maintain accuracy and consistency in calibration of the machine in spite of such disturbing effects as variations in line voltage, changes in temperature, aging of lamps, photocells, vacuum tubes, and other elements of the electrical system, dust or dirt in the optical system, etc. In order to compensate for these effects which tend to vary the output of circuit response to the photo-electric cell, the circuit is compensated so that a standard output is obtained when a standard object is used and in effect the object examined is compared with a reference background.

Arrangements have been disclosed in some of the aforesaid patents for compensating the circuit at a predetermined point in its curve, usually the point corresponding to the output when a standard object is viewed. Consequently, when an unkown object is viewed the circuit responds in terms of deviation of the light reflectivity characteristic of the unknown object from the standard object or from the reference background.

In the copending application of David Cox, Serial No. 294,427, aforesaid, a two-point calibration was provided so that it was unnecessary to utilize a reference background corresponding closely in characteristic to sorted objects considered acceptable or close to the line of demarcation from the objects which were to be rejected. Moreover, the circuit could readily be adjusted for wide variations of response so as to trip relatively light articles or relatively dark articles without substituting different reference backgrounds and without detracting from the accuracy of the response. This was accomplished by utilizing two different backgrounds. There is a relatively dark one and a relatively light one. There are arrangements for compensating the circuit at two different points. For example, response of the photo-electric tube is adjusted when exposed to the light background and the amplification factor of the amplifier is adjusted with the photo-electric tube observing the dark background. With two points of calibration the straight line response was determined with the circuit calibrated throughout the response line. It will be understood that linear response circuits were employed so that the calibration line would be linear or a straight line.

I have found that, except for some minor effects of negligible consequence in most types of operation, a straight line calibration, with adequate compensation for sorting articles of various degrees of brightness or darkness, may be accomplished without necessitating the use of both light and dark backgrounds and mechanism for changing backgrounds during each cycle of operation. In accordance with my invention I simulate one of the two of the optical calibration points by making one calibration wholly electrically, simulating the effect of a predetermined light intensity upon the photo-electric cell by a corresponding electrical setting in the control circuit.

Preferably compensation for errors at the light end of the calibration curve affecting response to light sorted articles is accomplished in the manner described in the aforesaid Cox Patent 2,690,258 and application Serial No. 294,427 by adjusting the sensitivity of the photo-electric tube. Compensation for amplifier drift is accomplished by applying a fixed compensation voltage to the amplifier input in place of the voltage output of the photo-electric tube for response to a dark background. Linear amplifier circuits are used as in the copending Cox Patent 2,690,258 and application 294,427.

In carrying out the invention there is incorporated in the system a photo-electric tube of the electron multiplier type and means are provided by which the multiplication factor of this tube is regulated to correct for changes, both in this tube and in other units of the system, which affect the response of the system. As for regulating the amplifier itself, an additional regulating means is provided to compensate for drift.

The device by which the articles are segregated may be of any known type according to character of the articles and the apparatus by which they are presented for inspection.

A better understanding of the invention will be afforded by the following detailed description considered in conjunction with the accompanying drawings, in which:

Fig. 1 is a circuit diagram of a photo-electric sorting control circuit in accordance with my invention;

Fig. 2 is a schematic diagram illustrating mechanical elements of an assembly in which my improved control circuit may be employed to form a photo-electric sorting system; and Fig. 3 is a schematic diagram illustrating the order in which the various mechanical and electrical parts or elements may be caused to operate.

Like reference characters are utilized throughout the drawings to designate like parts.

Although the invention is not limited to any specific type of apparatus or system, for the sake of illustration and explanation it may be described as used in a free-fall type of photo-electric sorter such as disclosed in Cox Patent No. 2,656,923 or the copending Cox patent application, Serial No. 294,427. As schematically represented in Fig. 2 the apparatus includes a photo-electric sorting head or sorting chamber 11 above which there is an upper gate 12 and below which suitable means are provided for classifying the articles according to the response of photo-electric tube means 13 to an article such as a lemon 14 upon reaching a position in the photo-electric sorting head 11 opposite the photo-electric tube means 13. For simplicity, the classifying or segregating device is represented in Fig. 2 as a diverter 15, which may be of the type represented in the Cox Patent No. 2,656,933, with an actuator 16 responsive to a control circuit 17 including a photo-electric amplifier connected to the photo-electric tube means 13. The arrangement is such that the diverter 15 may be held in the position illustrated in Fig. 2 causing articles to be diverted into a bin 18 or may be retracted to permit the articles to drop into a bin 19.

It will be understood that the photo-electric sorting head 11 includes light sources 21 mounted in suitable channels and shielded so as to cast only indirect illumination upon the article 14 as described in the aforesaid patent. There are also background means 22 which may consist of one or more gray backgrounds mounted opposite the photo-electric tube means 13, so that the photo-electric sorting head gives a response representing the reflectivity of the background means 22 when no article 14 is in position and the photo-electric tube means 13 gives a response corresponding to the reflectivity of the article 14 when there is such an article in the head 11.

Suitable means are provided for opening and closing the upper gate 12 for releasing of articles 14 into the head 11 for photo-electric inspection. For example, as represented schematically, there may be motor driven linkage including an electric motor 24, a drive shaft 25, carrying a crank disc 26, connected through a connection rod 27 and a cross link 28, to cranks 31 and 32 secured to release leaves 33 and 34 of the upper gate 12. Means are provided for synchronizing the operation, regulation and compensation of the control circuit 17 with the time of release of the upper gate 12, making allowance for the time required for the article 14 to travel through the sorting head 11 to a level opposite the photo-electric tube means 13. For this purpose, in the illustrated embodiment a drum switch 35 and an S-slot barrel switch 36 are provided, driven by the same drive shaft 25 as the upper gate 12.

The connections of the photo-electric control circuit 17 are illustrated in Fig. 1. For energizing the circuit a suitable source of direct current is employed, for example, one having lines 41 and 42 maintaining voltage at 300 volts above and below a grounded neutral line 43. The photo-electric tube 13 is of the multiplier type, having an anode 44, cathode 45 and dynodes 46. For controlling the voltage applied to the electrodes of the tube 13 there is a regulator tube 47, which may be of the triode type. As illustrated the triode 47 includes an anode 48, cathode 49 and control electrode 50. The cathode 49 is connected to the negative line 42 through a cathode resistor 53. The anode 48 is connected to the cathode 45 of the multiplier tube 13. The anode 44 of the multiplier tube 13 in turn is connected through an anode resistor 58 to a point 54 on a voltage divider consisting of resistors 55 and 56 connected in series between the positive voltage line 41 and the ground line 43.

For amplifying the output from the anode 44 of the multiplier tube 13, an amplifier is provided comprising a pentode preamplifier tube 59 coupled to one or more subsequent amplifier stages represented by the box 61 having output terminals 62 and 63, the latter one being grounded.

It will be understood that the mechanical separating means such as the diverter 15 or the like has operating means, for example, the electrical actuator 16 of Fig. 2 connected directly or through suitable power amplifier means to the output terminals 62 and 63.

The preamplifier 59 is shown as being of the multi-grid type such as a pentode, for example, having an anode 64, a cathode 65 and grids 66 and 67 together with a suppressor grid not shown. One of the grids, preferably the first grid 66, is connected to the anode 44 of the multiplier tube 13 so as to be responsive thereto. The second grid, such as the screen grid 67, of the pentode 59 is connected to a terminal 68 adjustable in potential for controlling the gain of the pentode amplifier tube 59. For controlling the potential of the point 68, an amplifier drift compensator tube 69 is provided, which may be pentode but for simplicity is shown as triode, with an anode 71, cathode 72 and a control electrode or grid 73. The anode 71 is connected to the positive line 41 through an anode resistor 74, the terminal 68 being connected to the andoe 71. A bias condenser 75 is interposed between the cathode 72 and the grid 73 of the amplifier compensator tube 69.

For calibrating the amplifier, an intermittent feedback connection is provided from the amplifier output terminal 62 through a voltage divider or potentiometer 76 having a movable tap 77. For intermittently connecting the grid 73 to the calibration voltage point 77, the amplifier compensator switch 78 is provided having stationary contacts 79 and 80 and a movable contact 81. The switch 78 is interposed in a conductor 83 connecting tap 77 to the grid 73 of the tube 69.

For simulating the effect upon the amplifier 61 of exposing the photo-electric tube 13 to the very dark background or a "black" background an electrical connection is provided for raising the potential of the amplifier grid 66 sufficiently to represent the potential of the anode 44 of the multiplier tube 13 when no light is shining and only the "dark" current is flowing. For this purpose a switch 85 is provided, having stationary contacts 86 and 87 and a movable contact 88. The contact 86 may be connected to the common end terminal 54 of the resistors 55 and 56 and the contact 87 is connected to the grid 66 of the preamplifier tube 59. Preferably, however, in order to provide manual adjustment of compensation for glare and dark current, the contact 86 is connected to an adjustable tap 57 on the resistor 56.

For readjusting the sensitivity of the photo-electric tube 13 to allow for variations of lamp and filament voltage, temperature, tube aging, dust on lamp and optical surfaces, and other similar factors, a regulator circuit is provided. The regulator includes a reference voltage source, which may take the form of a voltage divider resistor 89 connected between positive line 41 and the ground line 53 and having an adjustable tap 91 and a regulator or transfer condenser 92.

It will be understood that the regulator tube 47 is provided with a grid-setting condenser 93 connected between the control grid 50 and the negative line 42.

For intermittently shifting the regulator condenser 92 between the reference voltage point 91 and the amplifier output terminal 62, and adjusting the potential of the regulator tube grid 50 for compensating any deviation in the voltage output of the amplifier 61, double-throw switch means are provided. These include stationary contacts 94 and 95 connected to the tap 91 and the negative line 42 respectively, stationary contacts 96 and 97 connected to the amplifier output terminal 62 and the regulator grid 50 respectively, and movable contact 98 and 99, between which the regulator condenser 92 is connected. The contacts 98 and 99 are adapted to be moved simultaneously between the position in which the contacts 98 and 99 contact the terminals 94 and 95 respectively and a momentarily made position in which the contacts 98 and 99 contact the terminals 96 and 97 respectively. If desired a barrel cam 36 with an S groove as illustrated in Fig. 2 may be employed for actuating movable contacts 98 and 99. However, for simplicity in Fig. 3, in order to correlate the explanation of the operation of the various switches in the sequence diagram of Fig. 3, the corresponding segment arrangement of a drum switch is represented diagrammatically. My invention does not exclude an arrangement in which the transfer switch connections are changed to shift the condenser 92 back and forth from a connection between contacts 97 and 95 to a connection between contacts 94 and 96, whereby less potential difference occurs between the condenser plates and greater variations of the potentials of the plates with respect to ground result.

The time required for the article resting in the upper gate 12 to fall to the position in the sorting chamber 11 where it is within the field of view of the photo-electric means 13 as represented by the article 14 is fixed by the acceleration of gravity. The relative angular positions of the drum switch 35, the barrel cam 36 and the crank disk 26 on the drive shaft 25 are therefore made such that the regulation of the photo-electric tube means 13 and the drift compensation of the amplifier means 59 and 61 are effected at different times in the operating cycle and at a time when the article 14 is not within the field of view of the photo-electric tube means 13. Both compensations may be made while the background 22 is exposed. The observation of the light-reflectivity characteristic of the article 14 by the photo-electric tube means 13 is made when the article 14 intercepts the background 22 so that the photo-electric tube means 13 responds to light reflected from the falling article 14 instead of from the background 22. It is, therefore, unnecessary to move the background or to provide mechanical means for intercepting.

As represented by the sequence diagram of Fig. 3, the background 22 is exposed during the first part of the operating cycle and thereafter the article 14 comes within the field of view of the photo-electric tube means 13. During the first part of the portion of the cycle when the background 11 is exposed, the amplifier drift compensation is effected.

For the sake of simplicity in Fig. 3 all of the electric circuit operations are represented as effected by segments of drum switches although preferably in practice an S-slot, fast acting, barrel-cam switch 36 is employed for making the momentary connections of the transfer condenser 92. The switches 78 and 85 may, in practice, also be cam actuated. The drum switch 35 has a segment 88 constituting the movable contact of the switch 85 which is first to make contact with its cooperating stationary contacts 86 and 87. As represented by the arrow 101 in Fig. 3, the relative motion of the movable contacts with respect to the stationary contacts 86, 87, 88, 94, 96, 97, and 95 is upward. The segment 81 is offset so that it does not make contact with the stationary contacts 79 and 80 until after the contact with the stationary contact 86 and 87 has been made by the segment 88. Accordingly, the potential of the control grid 61 of the pentode amplifier 59 is first brought to a fixed value determined by the tap 57 of the voltage divider set at a point to correspond to the potential of the anode 44 of the photo-electric tube 13 when no light is shining upon it and relatively little current is flowing (only the dark current). In consequence, there is relatively little voltage drop through the resistors 58 and 55. Thereupon the connection through the line 83 is completed from the output voltage divider point 77 to the control grid 73 of the drift compensator tube 69 to readjust the potential of the condenser 75 if necessary in response to any deviation of output voltage at the terminal 62 to overcome any drift of the amplifier stages 59 and 61.

During this time, the transfer condenser 92 may have been floating freely or, if desired, may have been continuously connected, as schematically represented by drum switch segments 102 and 103, to reference voltage terminals 94 and 95 for fixing the charge thereof. After the compensation of the amplifier has been completed and the switches 85 and 78 have reopened, the condenser 92 is momentarily shifted to make contact with the output terminal 96 of the amplifier 61 and the grid 50 of the regulator tube 47. This is represented schematically by the drum switch segments 104 and 105. The condenser 92 is disconnected again from the contacts 96 and 97, however, before the article 14 comes within the field of view of the photo-electric tube means 13. This is represented in Fig. 3 by the termination of the contact segments 104 and 105. If desired, the condenser 92 may again be connected to the reference voltage terminals 94 and 95 while the articles are in the field of view as represented by drum switch segments 106 and 107.

While the invention has been described as embodied in concrete form and as operating in a specific manner in accordance with the provisions of the patent statutes, it should be understood that the invention is not limited thereto, since various modifications will suggest themselves to those skilled in the art without departing from the spirit of the invention, the scope of which is set forth in the annexed claims.

What I claim as new and desire to secure by Letters Patent of the United States is:

1. A compensated control circuit for a photo-electric sorter comprising in combination an amplifier drift compensation tube having a cathode, an anode and a control electrode, a pre-amplifier tube having a cathode, an anode and first and second control electrodes, an electron multiplier type photo-electric tube having a cathode and dynodes and having an anode connected to the first control electrode of the pre-amplifier tube, the drift compensation tube anode being connected to the second control electrode, means connected to the output of the pre-amplifier tube to give a response in accordance with light intensity to which the photo-electric tube is subjected, having an output terminal, a regulator tube having a cathode and a control electrode and having an anode connected to the photoelectric tube cathode for controlling the interelectrode voltage of said photo-electric tube, an amplifier drift compensation voltage divider coupled to said output terminal, a transfer condenser, a regulator reference voltage source to which the condenser is adapted to be connected, means for momentarily transferring the condenser to connection between the output terminal and the control electrode of the regulator tube to compensate for aging, means for elevating the potential of the first control electrode of the pre-amplifier and, thereafter, while said grid potential is still elevated connecting the drift compensation voltage divider to the control-electrode of the drift compensation tube for readjusting the potential of the second control electrode of said pre-amplifier for compensating the amplifier for drift.

2. A compensated control circuit for a photo-electric sorter comprising in combination a pre-amplifier tube having a cathode, an anode and first and second control electrodes, an electron multiplier type photo-electric tube having a cathode and dynodes and having an anode connected to the first control electrode of the pre-amplifier tube, means connected to output of the pre-amplifier tube to give a responsse in accordance with light intensity to which the photo-electric tube is subjected, having an output terminal, a regulator tube having a cathode and a control electrode and having an anode connected to the photoelectric tube cathode for controlling the interelectrode voltage of said photo-electric tube a transfer condenser, a regulator reference voltage source to which the condenser is connected, means for momentarily transferring the condenser to connection between the output terminal and the control electrode of the regulator tube to compensate for aging, means for elevating the potential of the first control electrode of the pre-amplifier and, thereafter, while said potential is still elevated, readjusting the potential of the second control electrode of said pre-amplifier for compensating the amplifier for drift.

3. A compensated control circuit for a photo-electric sorter comprising in combination an amplifier tube having a cathode, an anode and first and second control electrodes, an electron multiplier type of photoelectric tube having an anode, a cathode and dynodes, current responsive means connected in series with the photo-electric tube to give a voltage response to current variation in said photoelectric tube, means electrically connected to said current responsive means for varying the potential of said first control electrode according to said voltage response, means connected to the output of the amplifier tube to give a response in accordance with light intensity to which the photoelectric tube is subjected, having an output terminal, a regulator tube having an anode, a cathode and a control electrode, means for varying the interelectrode potential of the cathode and dynodes of said photoelectric tube in accordance with variation in current through said regulator tube, a transfer condenser, a regulator reference voltage source to which the condenser is connected, means for momentarily transferring the condenser to connection between the said output terminal and the control electrode of the regulator tube to compensate for aging, means for elevating the potential of the first control electrode of the amplifier tube and, thereafter, while said potential is still elevated, readjusting the potential of the second control electrode of said pre-amplifier for compensating the amplifier for drift.

4. A compensated control circuit for a photo-electric sorter comprising in combination an amplifier tube having a cathode, an anode and first and second control electrodes, an electron multiplier type photo-electric tube means connected to the first of said control electrodes of the amplifier tube to give a voltage response to variations in current through the photo-electric tube, means connected to output of the amplifier tube to give a response in accordance with light intensity to which the photo-electric tube is subjected, having an output terminal, a regulator tube having an anode, cathode, and a control electrode, means for varying the interelectrode voltage of the photo-electric tube in accordance with variations in current through the regulator tube, a regulator reference voltage source, means having a connection between said output terminal and said regulator reference voltage source for applying correcting voltage to the control electrode of the regulator tube in accordance with variations in potential between said output terminal and said regulator reference voltage source to compensate for aging, means for elevating the potential of the first control electrode of the amplifier tube and thereafter while said potential is still elevated readjusting the potential of the second control electrode of said amplifier tube for compensating the amplifier for drift.

5. A compensated control circuit for a photo-electric sorter comprising in combination an amplifier tube having a cathode, an anode and first and second control electrodes, a photo-electric tube, means connected to the first control electrode to give a voltage response to variations in current through the photo-electric tube whereby the amplifier output varies in accordance with light intensity to which the photo-electric tube is subjected, a regulator tube having a control electrode, means for varying the interelectrode voltage of the photo-electric tube in accordance with variations in current through the regulator tube, means connected to said amplifier output for applying a correcting voltage to the control electrode of the regulator tube in accordance with variations in the output of said amplifier tube to compensate for variations in the characteristics of the photo-electric tube, means for elevating the potential of the first control electrode of the amplifier tube and thereafter while said potential is still elevated readjusting the potential of the second control electrode of said amplifier tube for compensating the amplifier for drift.

6. A compensated control circuit for apparatus employing a photo-electric tube, the sensitivity of which fluctuates with interelectrode voltage, said circuit comprising in combination an amplifier tube having first and second control electrodes, a voltage sensitive photo-electric tube, means connected to the photoelectric tube to produce a voltage response to light intensity to which the photo-electric tube is subjected, a connection from the voltage response means to the first of said control electrodes, voltage adjusting means connected to the photoelectric tube, and intermittently connected to the amplifier output, for varying the interelectrode voltage of the photo-electric tube with variations in amplifier output to compensate for variations in the light responsive characteristic of the photo-electric tube, and means for elevating the potential of the first control electrode of the amplifier tube and thereafter while said potential is still elevated readjusting the potential of the second control electrode of said amplifier tube for compensating the amplifier for drift.

7. A compensated control circuit for apparatus employing a photo-electric tube, the sensitivity of which fluctuates with interelectrode voltage, said circuit comprising in combination an amplifier tube having first and second control electrodes, a voltage-sensitive photo-electric tube having electrodes, means connected to the photo-electric tube and to the first control electrode for producing an amplifier output responsive to light intensity to which the photo-electric tube is subjected, means intermittently receiving a votlage response to amplifier output for applying a correcting voltage to electrodes of the photo-electric tube and thereby readjusting the interelectrode voltage of said photo-electric tube to compensate for variations in the light-responsive characteristic thereof, and means for elevating the potential of the first control electrode of the amplifier tube and thereafter, while said potential is still elevated, readjusting the potential of the second control electrode of said amplifier tube in response to deviation in amplifier output for substantially readjusting the output to normal value for compensating the amplifier for drifting.

8. Apparatus as in claim 7 wherein the means for elevating the potential of the first control electrode includes a potentiometer adjustable to take into account glare effect upon the photo-electric tube and dark current thereof.

References Cited in the file of this patent

UNITED STATES PATENTS

| 2,412,423 | Rajchman et al. | Dec. 14, 1946 |
| 2,454,871 | Gunderson | Nov. 30, 1948 |
| 2,534,668 | Gunderson | Dec. 19, 1950 |
| 2,656,923 | Cox | Oct. 27, 1953 |